Figure 6:
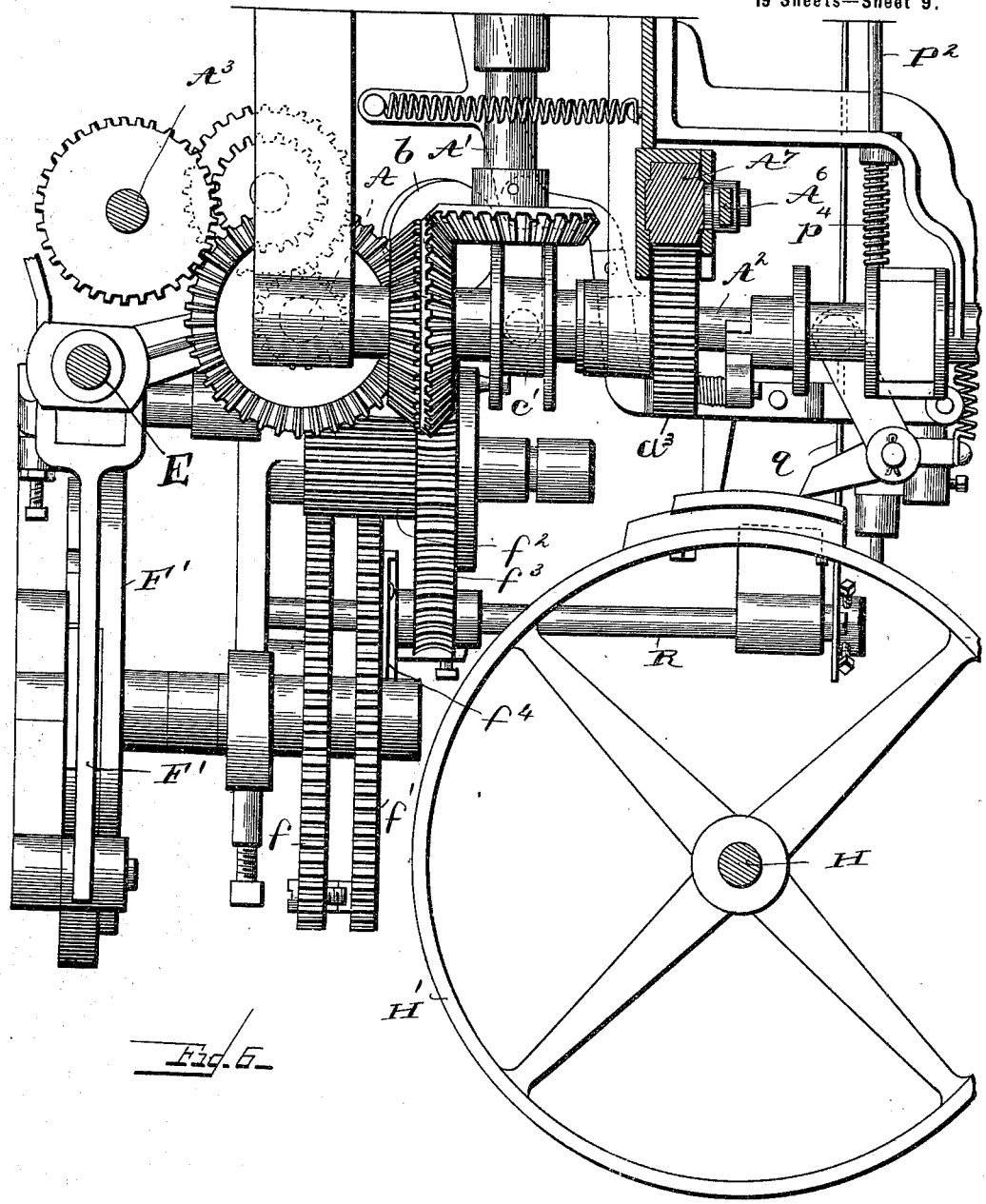

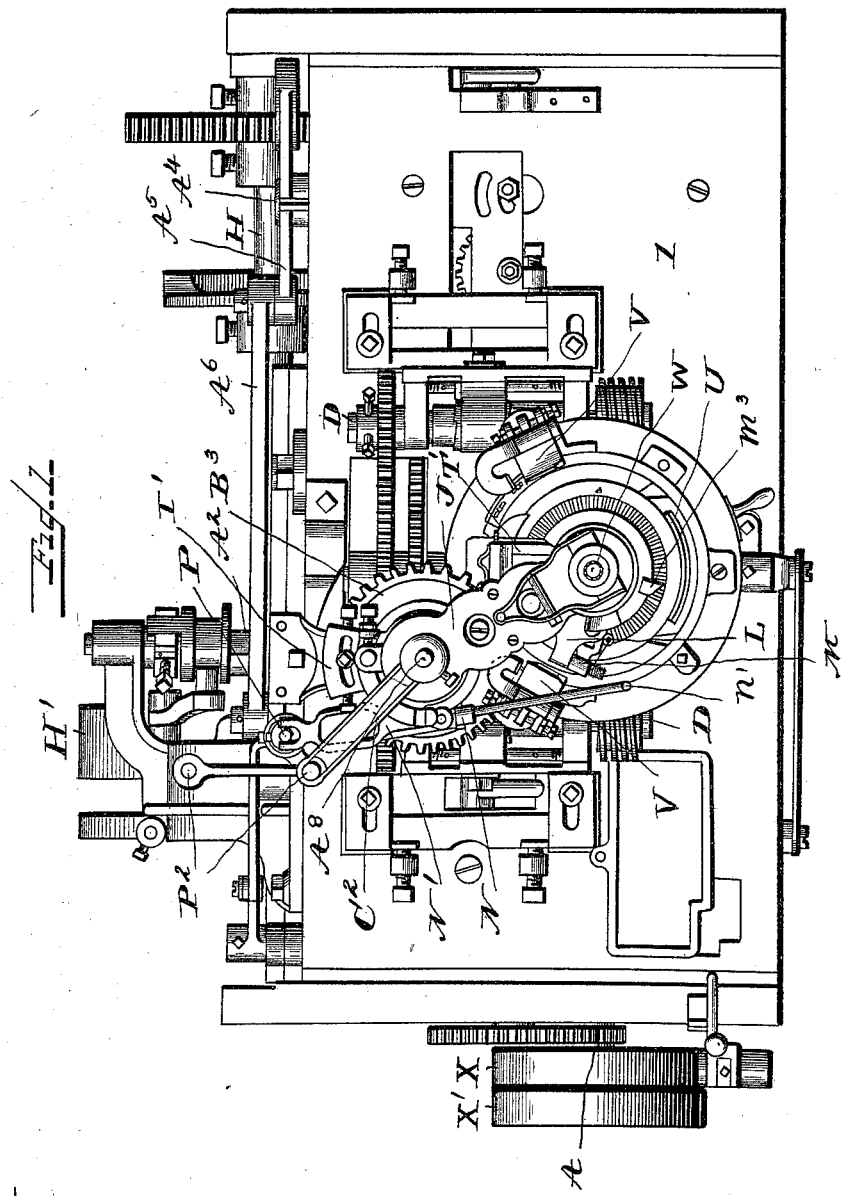

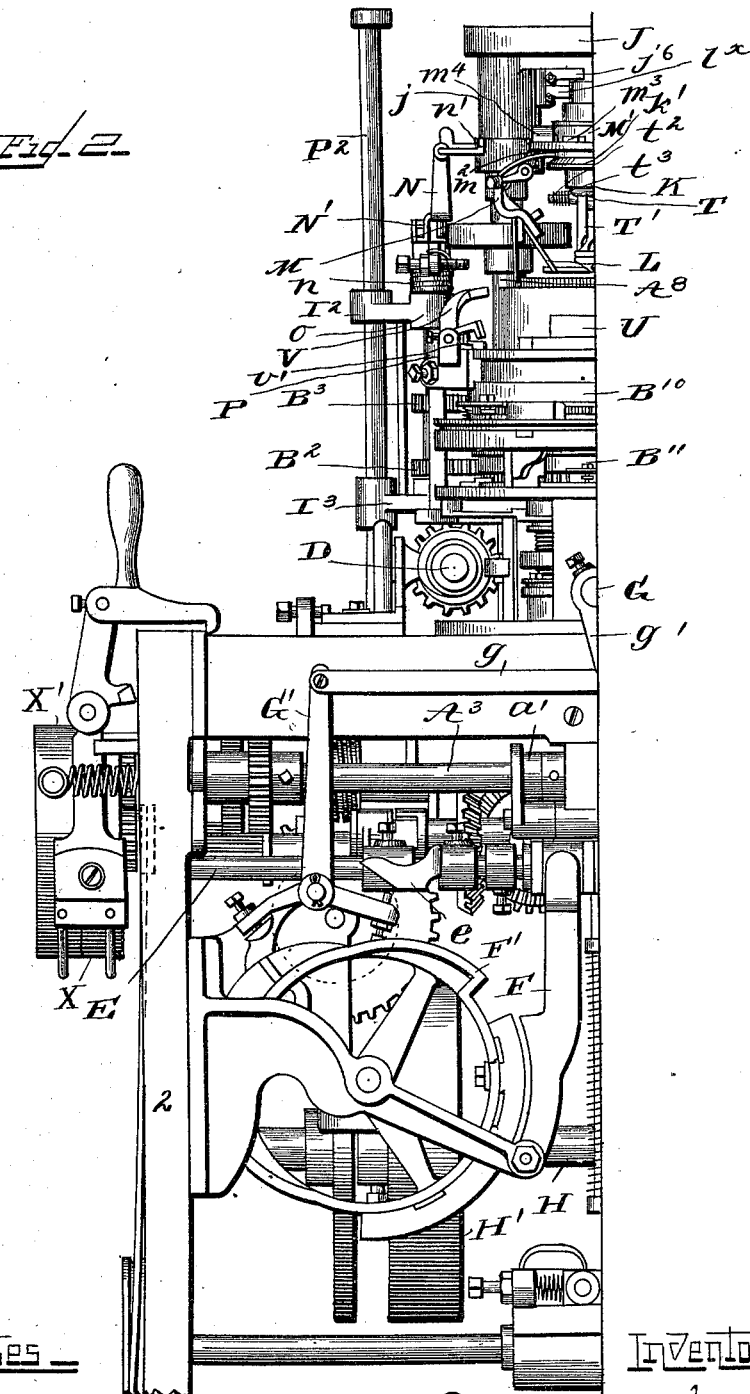

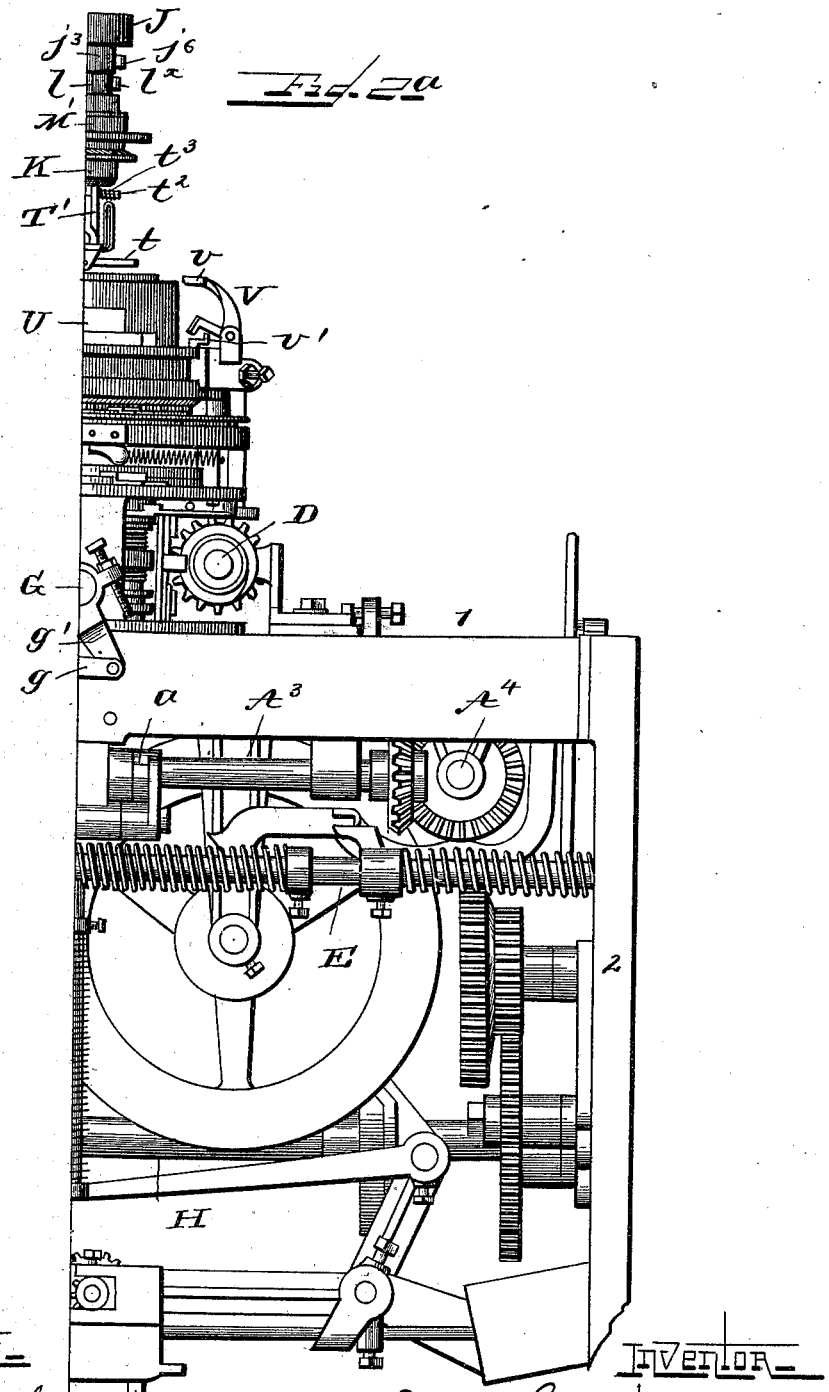

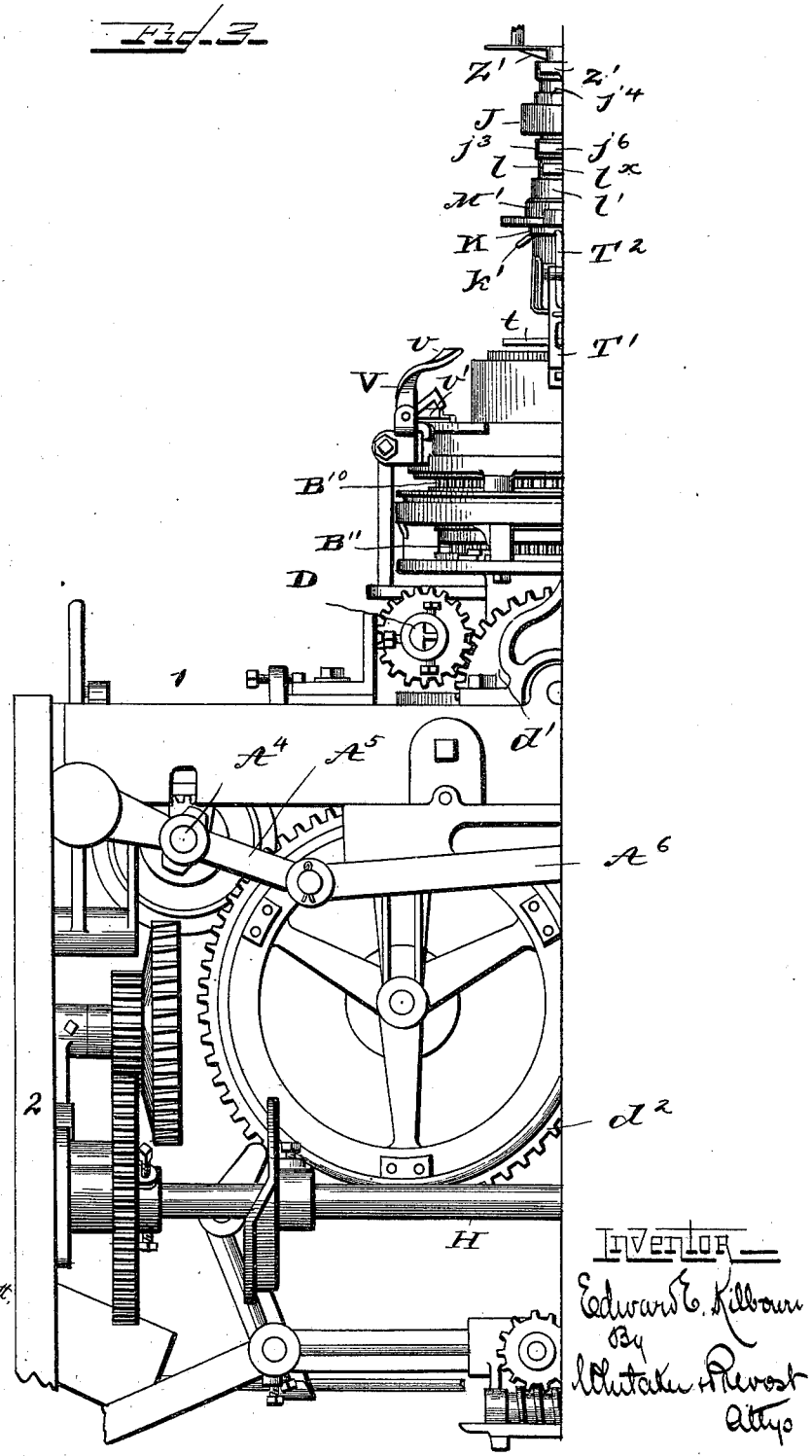

No. 669,730. Patented Mar. 12, 1901.
E. E. KILBOURN.
KNITTING MACHINE.
(Application filed Nov. 3, 1898.)
(No Model.) 19 Sheets—Sheet 5.
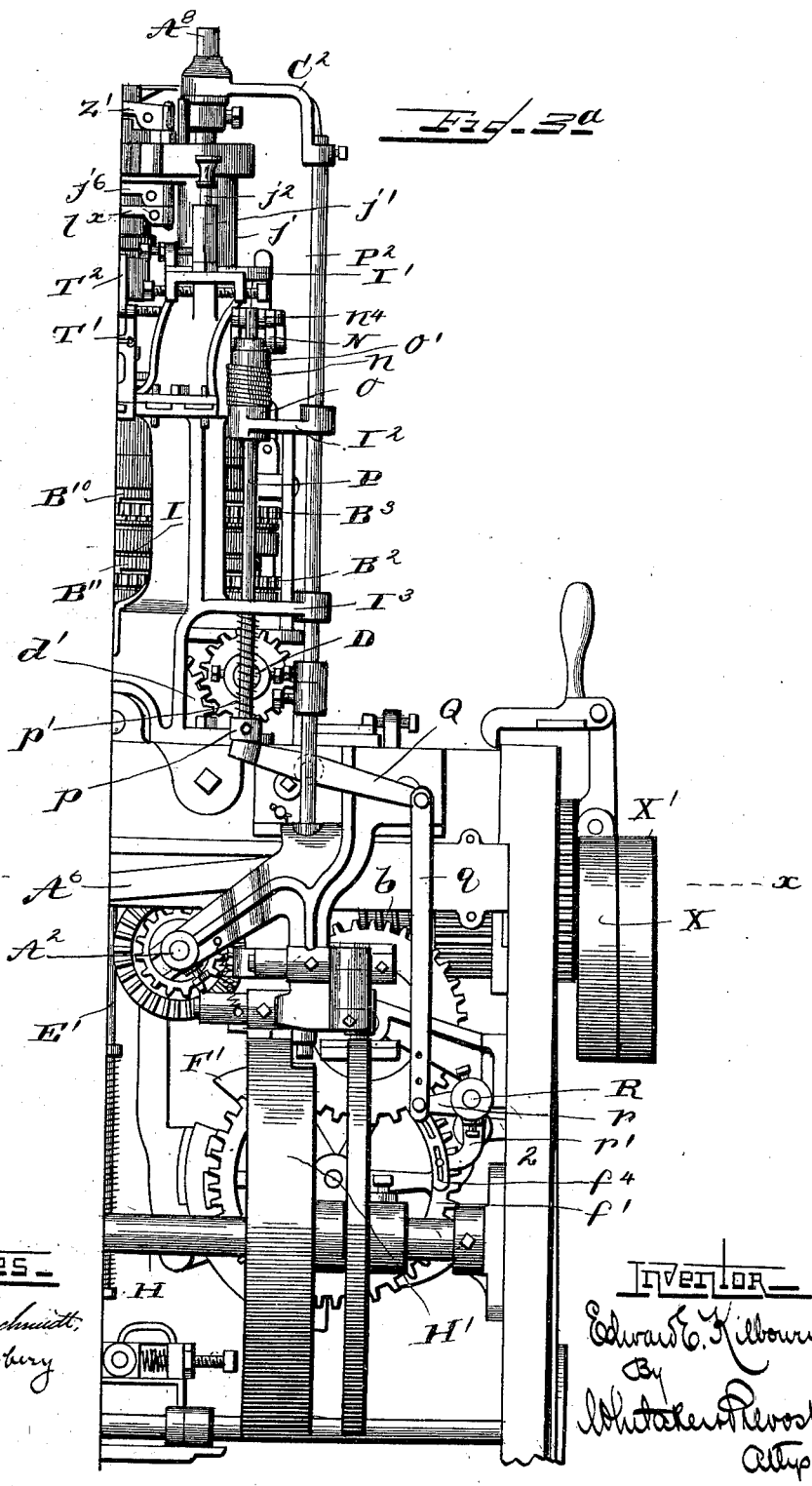
Witnesses
G. A. Paubenschmidt
J. D. Kingsbury
Inventor
Edward E. Kilbourn
By Whitaker Prevost
Attys.

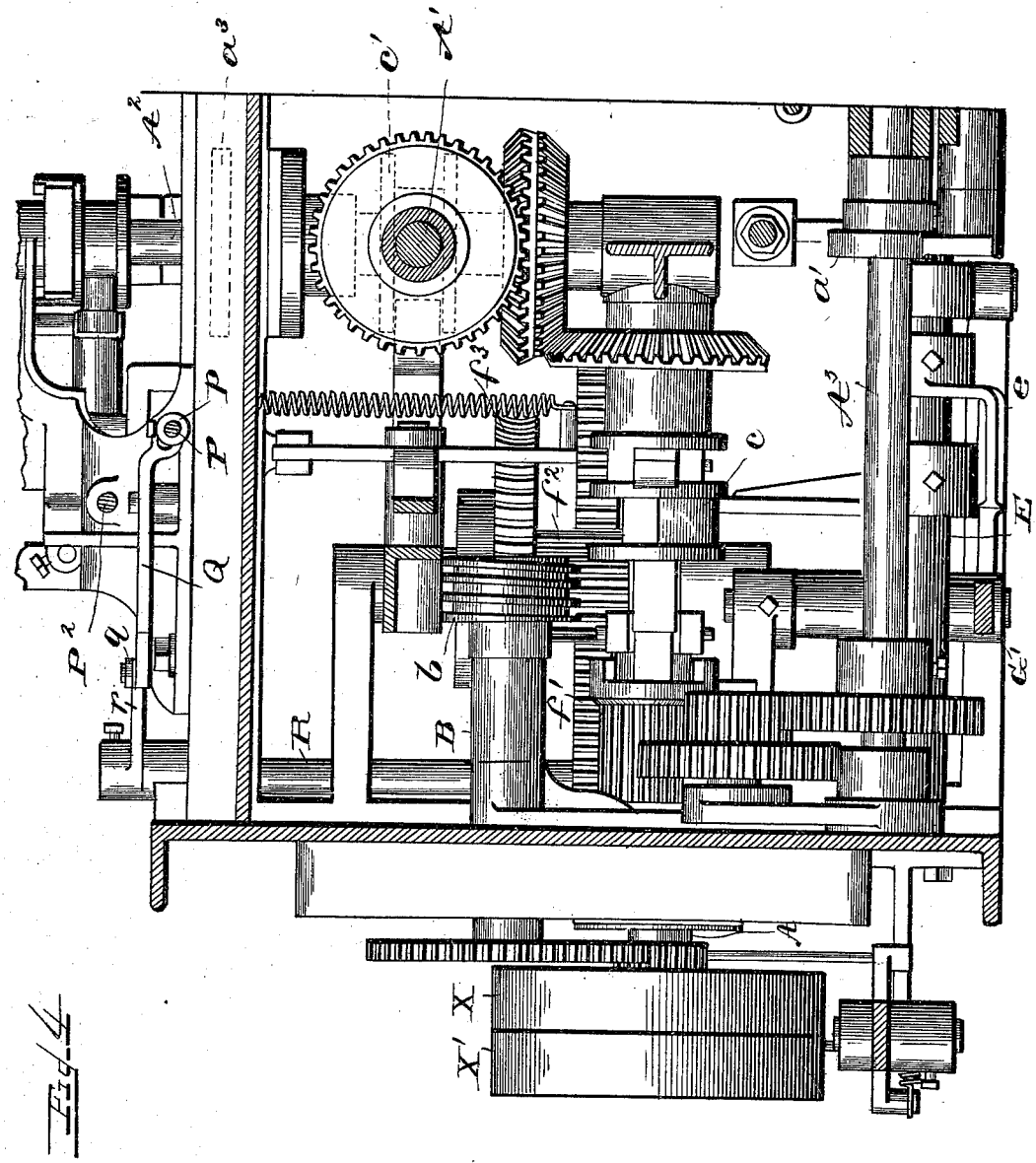

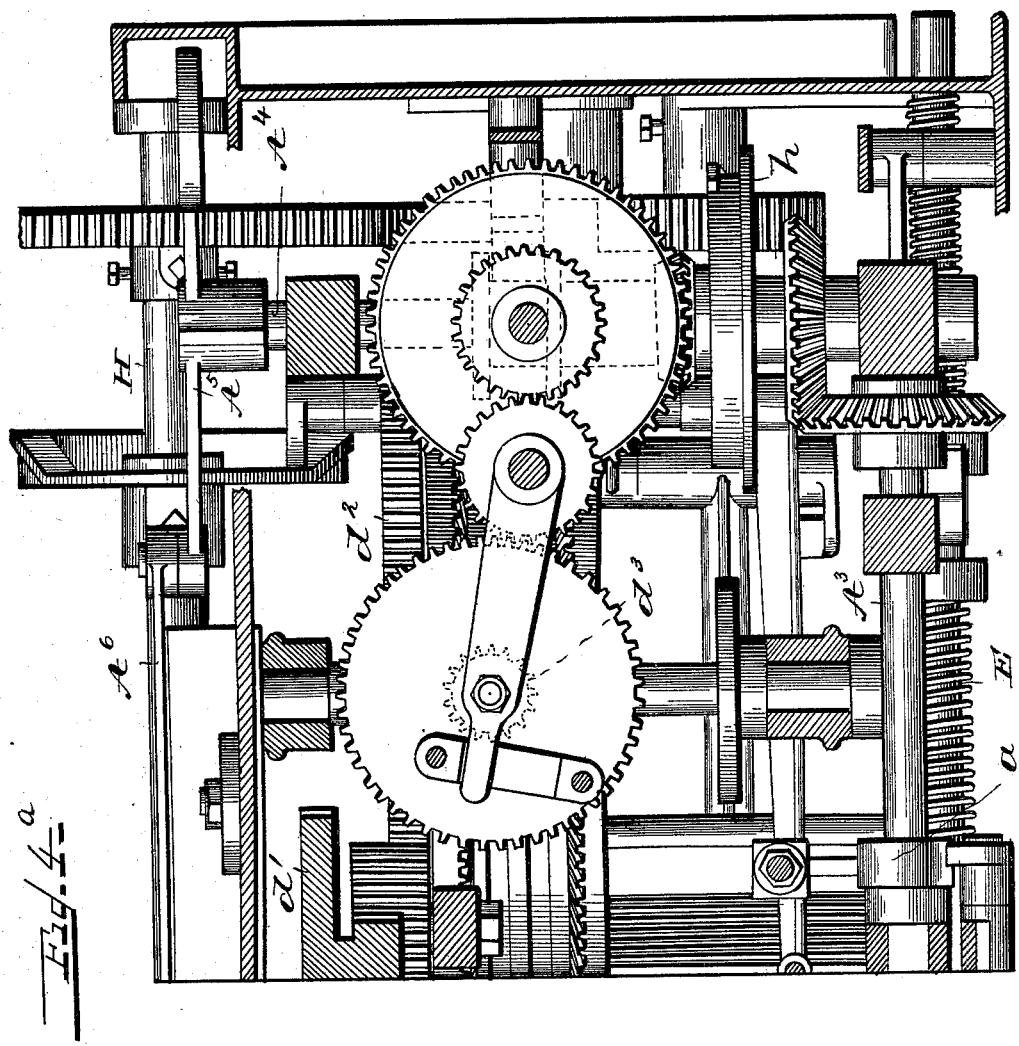

No. 669,730. Patented Mar. 12, 1901.
E. E. KILBOURN.
KNITTING MACHINE.
(Application filed Nov. 3, 1898.)
(No Model.) 19 Sheets—Sheet 8.
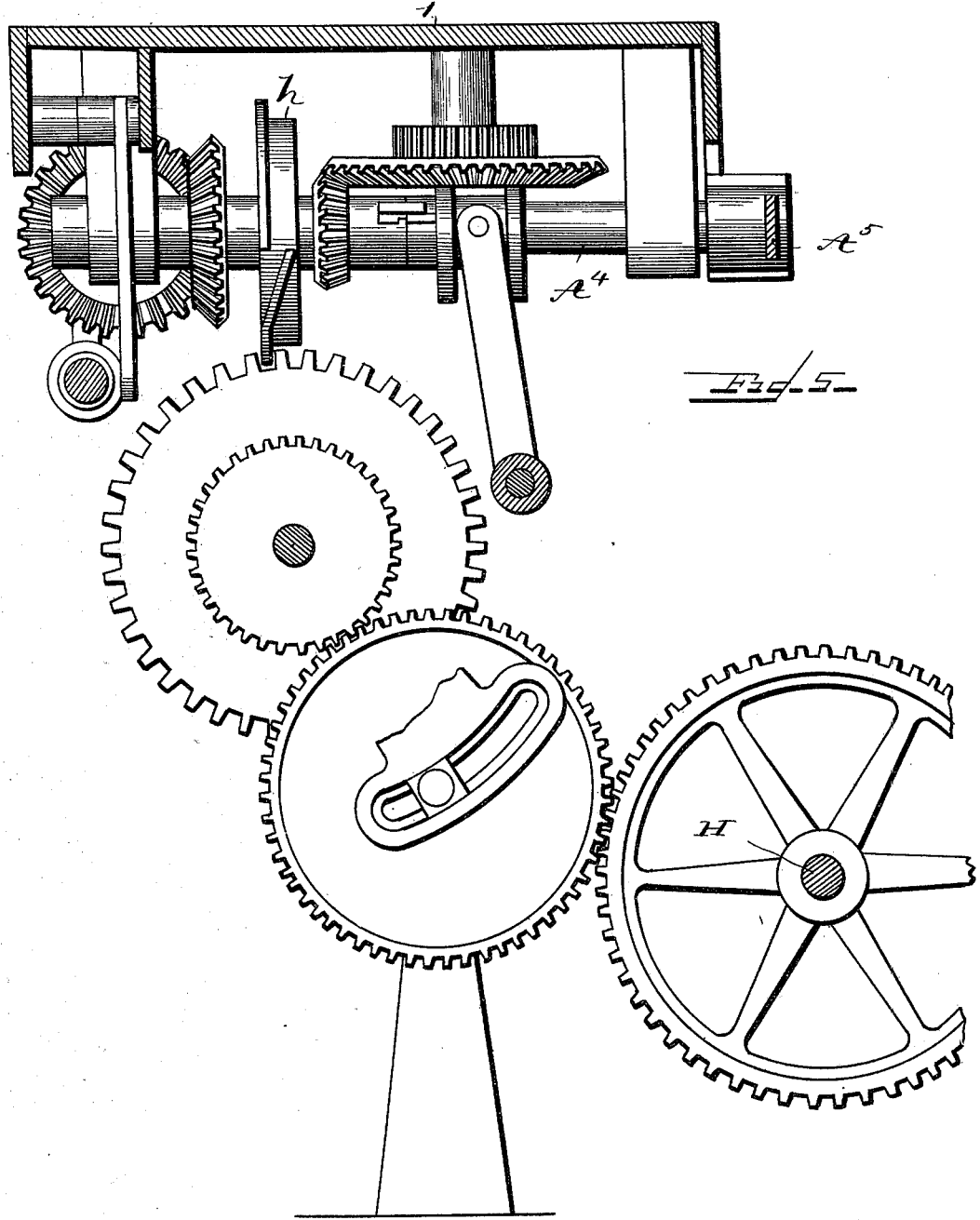

No. 669,730. Patented Mar. 12, 1901.
E. E. KILBOURN.
KNITTING MACHINE.
(Application filed Nov. 3, 1898.)
(No Model.) 19 Sheets—Sheet 9.

Witnesses
G. A. Paubenschmidt
J. D. Kingsbery

Inventor
Edward E. Kilbourn
By Whitaker & Prevost
Attys.

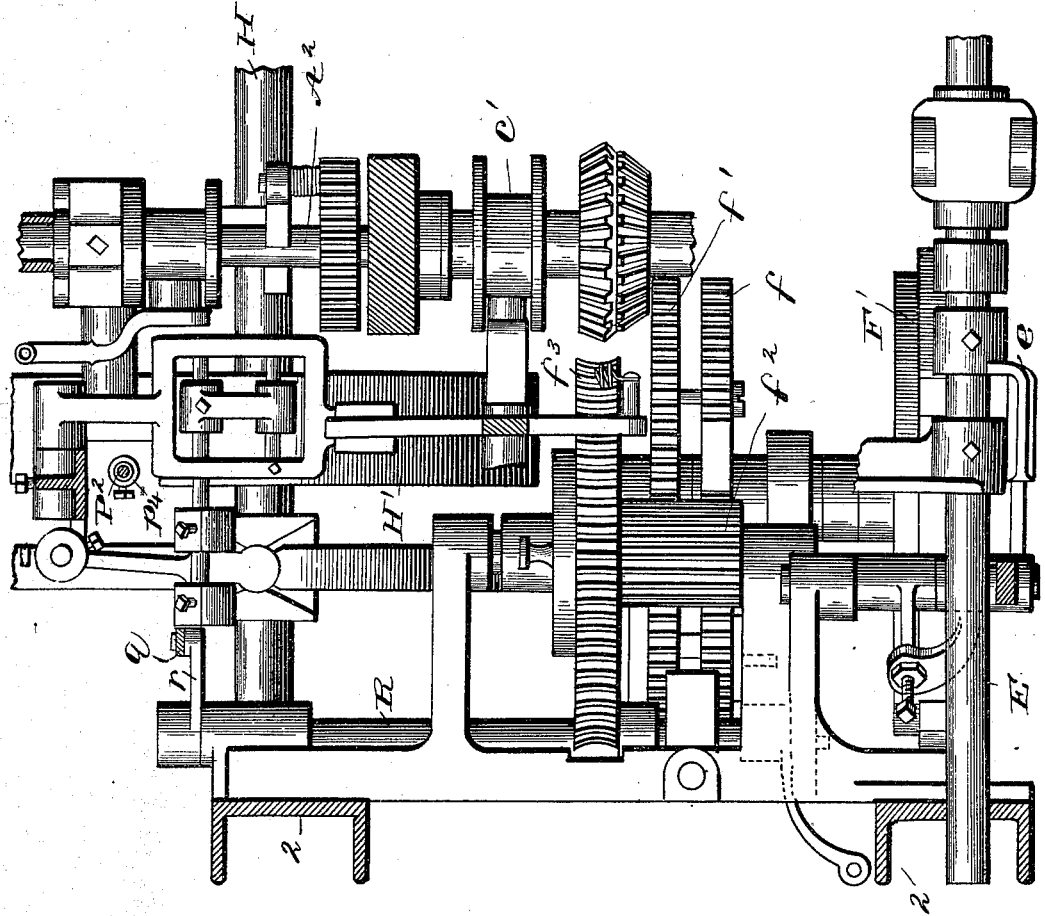

No. 669,730. Patented Mar. 12, 1901.
E. E. KILBOURN.
KNITTING MACHINE.
(Application filed Nov. 3, 1898.)
(No Model.) 19 Sheets—Sheet 11.
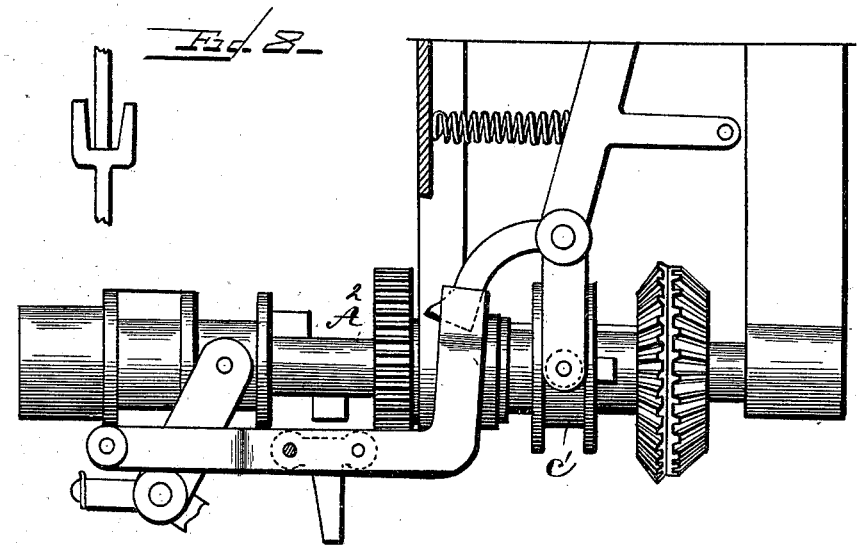
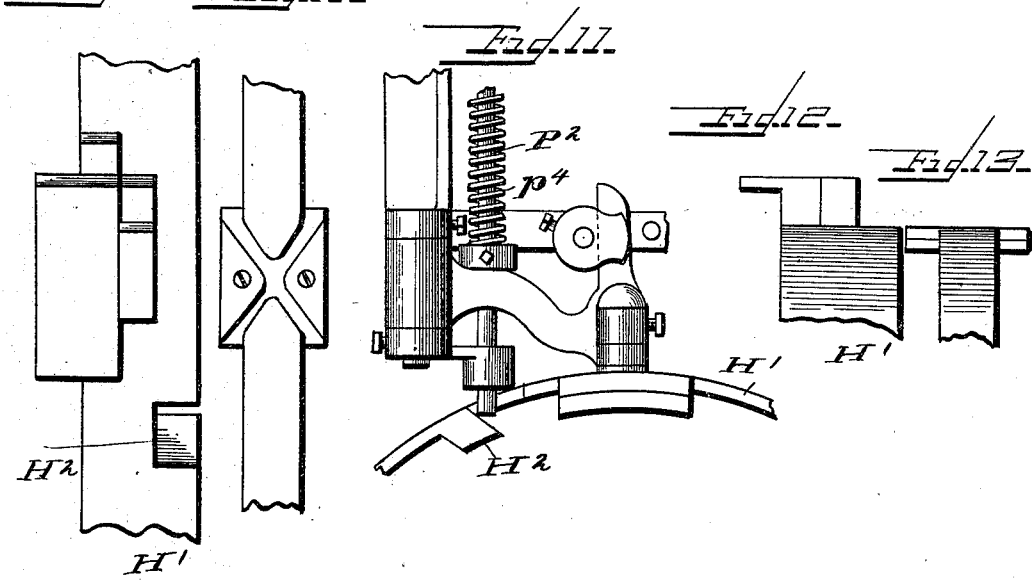
Witnesses
G. A. Pauberschmidt
J. D. Kingsbury
Inventor
Edward E. Kilbourn
By Whitaker & Prevost
Attys.

No. 669,730. Patented Mar. 12, 1901.
E. E. KILBOURN.
KNITTING MACHINE.
(Application filed Nov. 3, 1898.)
(No Model.) 19 Sheets—Sheet 12.

Witnesses
G. A. Rauberschmidt
J. D. Kingsbery

Inventor
Edward E. Kilbourn
By Whitaker & Prevost
Attys.

No. 669,730. Patented Mar. 12, 1901.
E. E. KILBOURN.
KNITTING MACHINE.
(Application filed Nov. 3, 1898.)
(No Model.) 19 Sheets—Sheet 13.
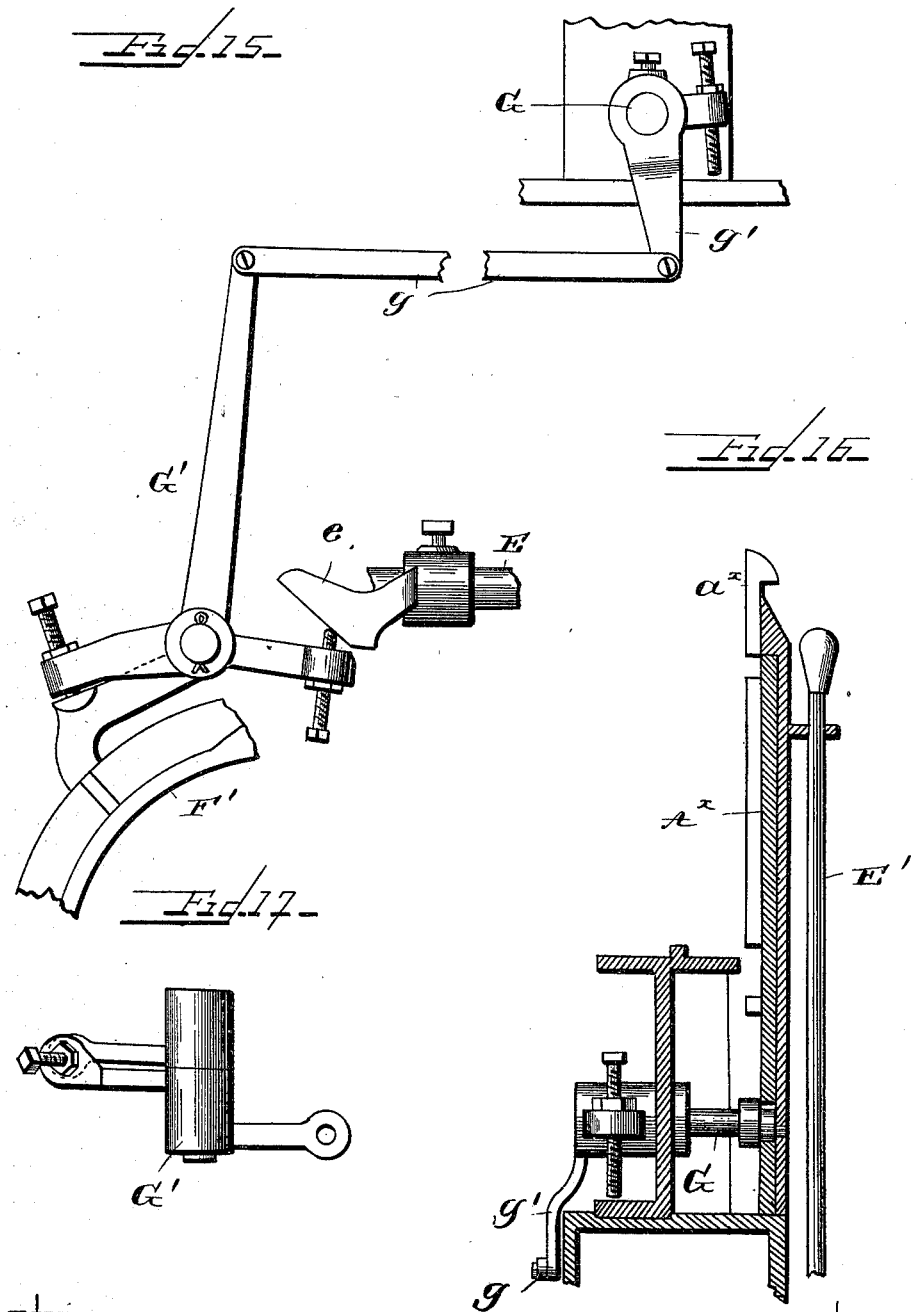
Witnesses
G. A. Vauberschmidt.
J. D. Kingsbury.
Inventor
Edward E. Kilbourn
By Whitaker Prevost
Attys.

No. 669,730. Patented Mar. 12, 1901.
E. E. KILBOURN.
KNITTING MACHINE.
(Application filed Nov. 3, 1898.)
(No Model.) 19 Sheets—Sheet 14.
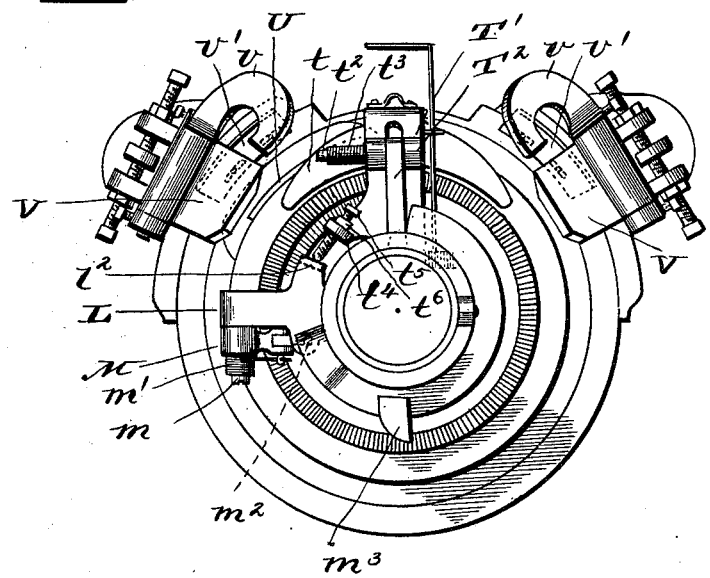
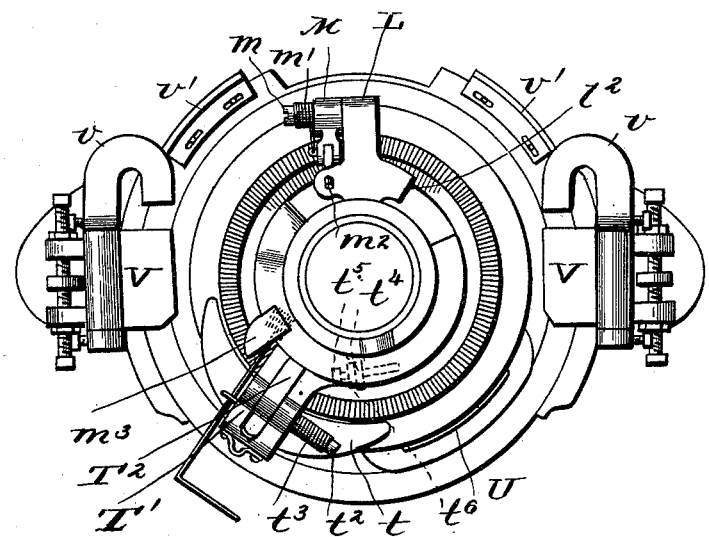

No. 669,730. Patented Mar. 12, 1901.
E. E. KILBOURN.
KNITTING MACHINE.
(Application filed Nov. 3, 1898.)
(No Model.) 19 Sheets—Sheet 15.
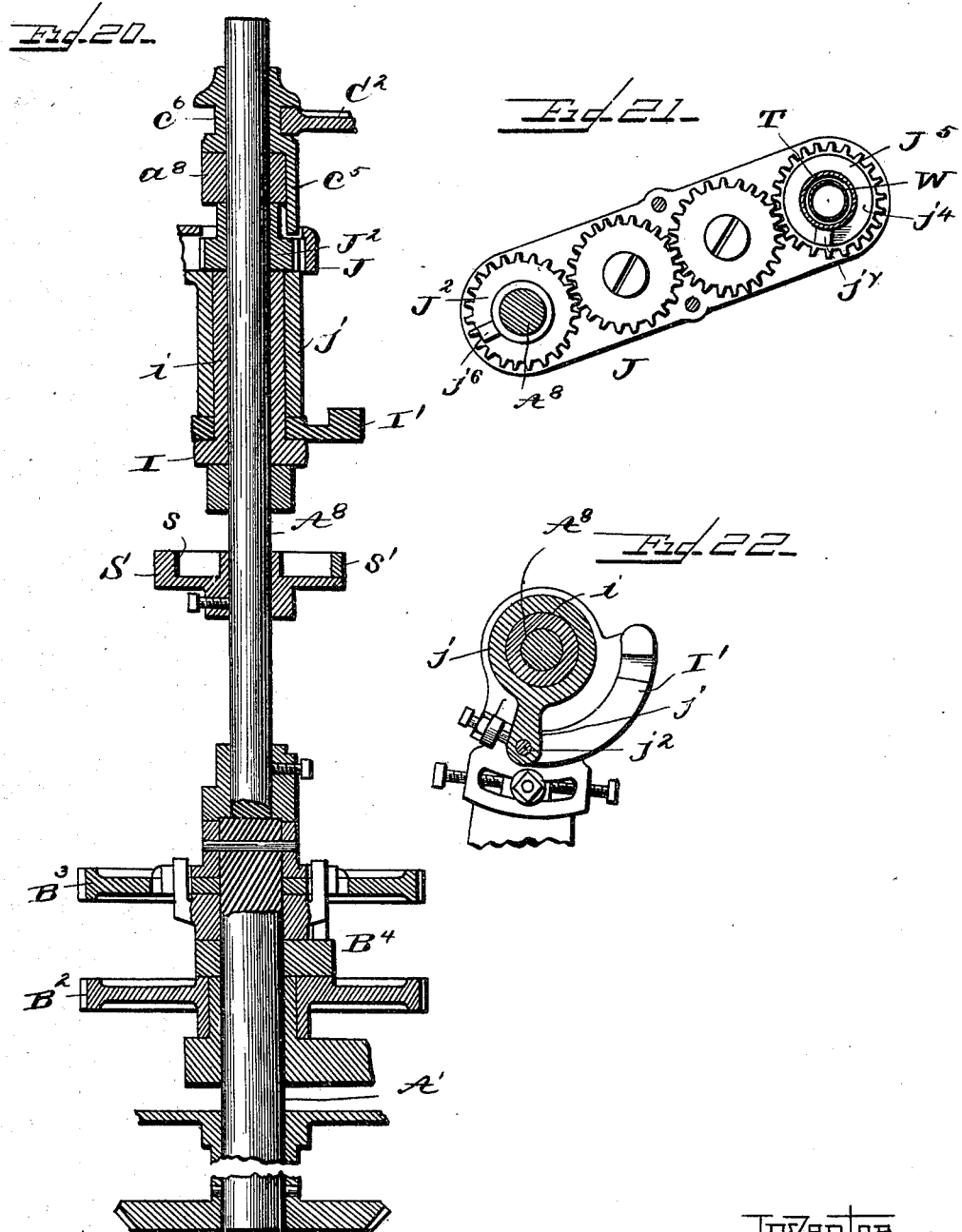

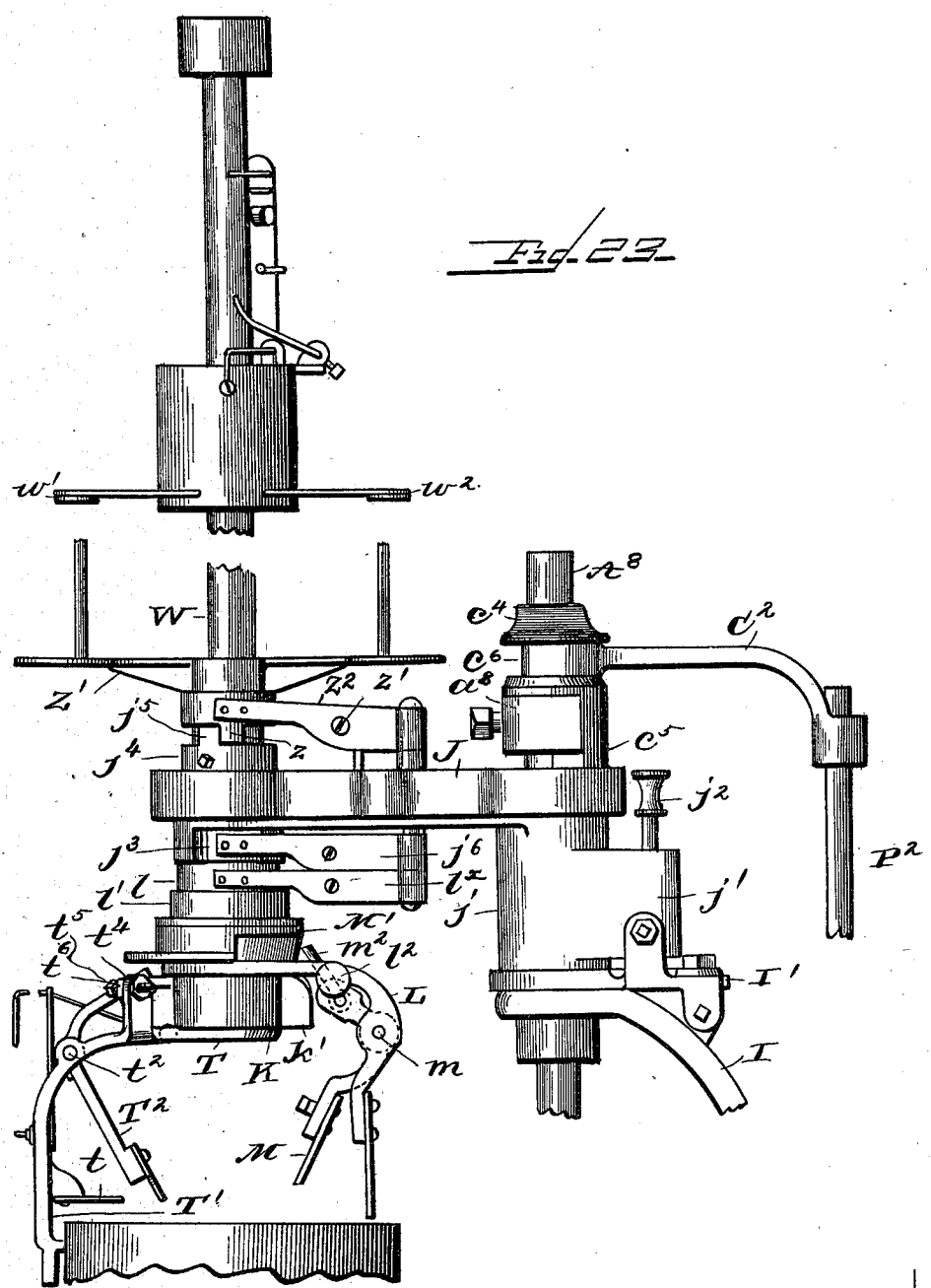

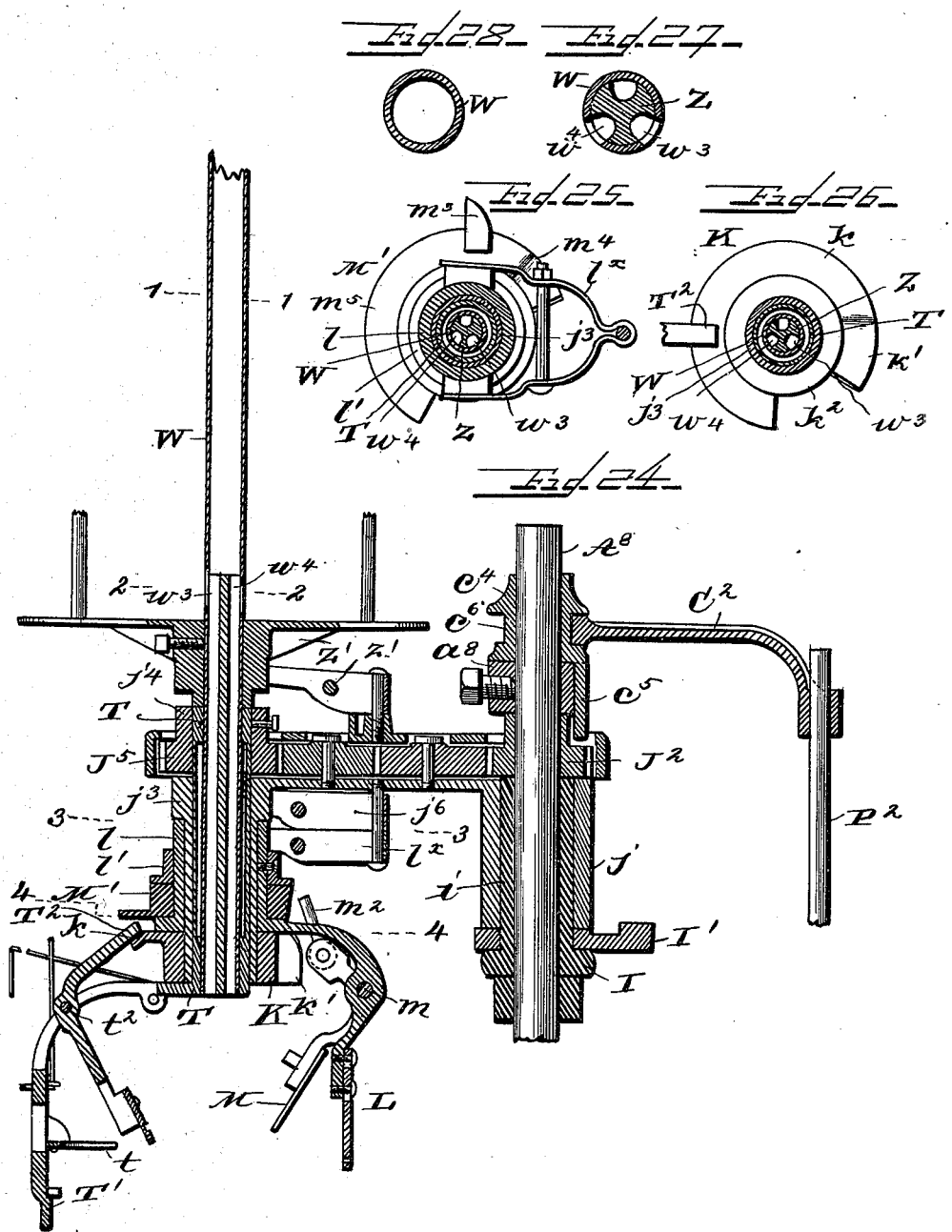

No. 669,730. Patented Mar. 12, 1901.
E. E. KILBOURN.
KNITTING MACHINE.
(Application filed Nov. 3, 1898.)

(No Model.) 19 Sheets—Sheet 18.

Witnesses:
G. A. Tauberschmidt,
J. D. Kingsbery.

Inventor:
Edward E. Kilbourn
by Whitaker & Prevost attys.

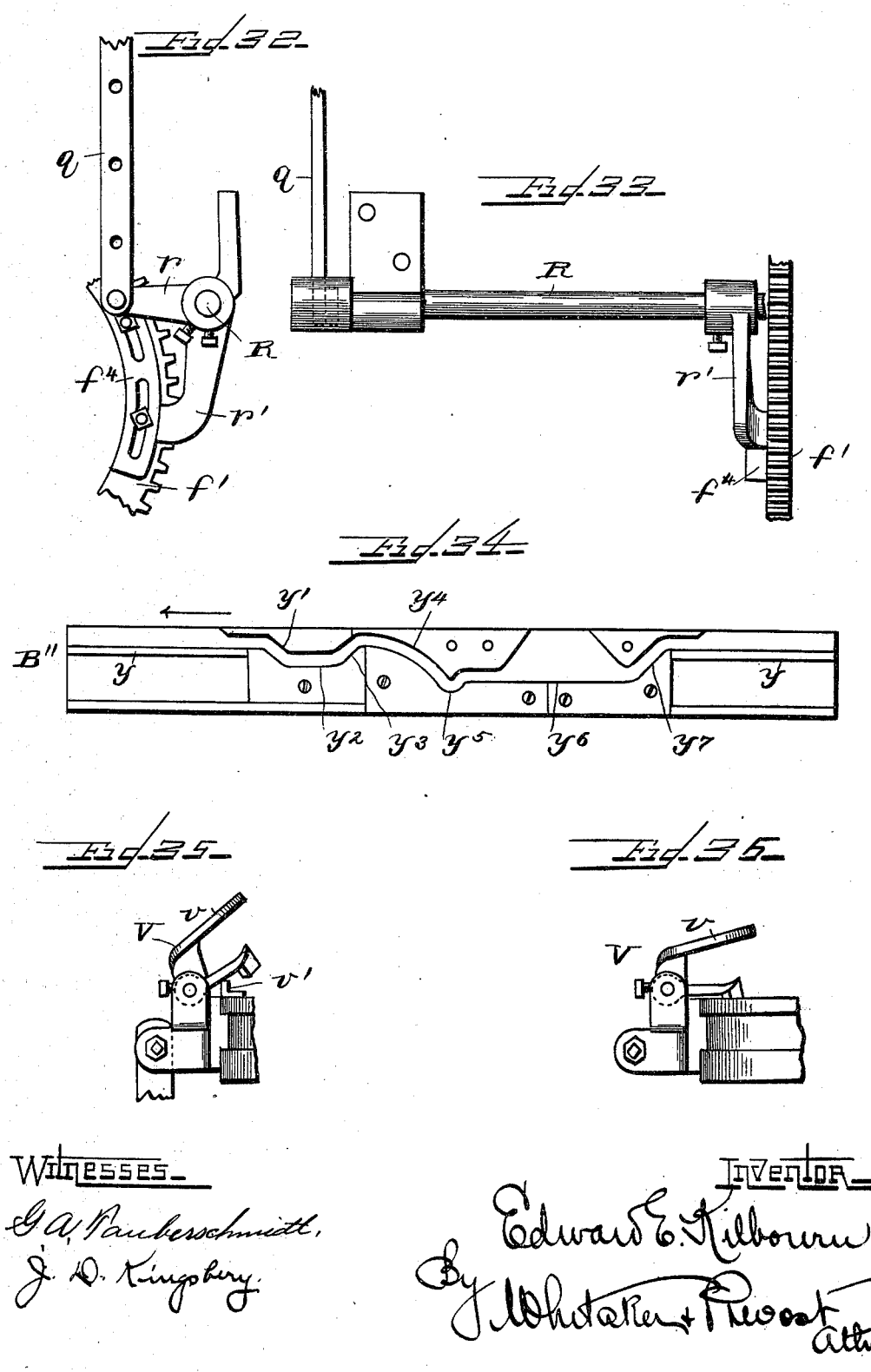

UNITED STATES PATENT OFFICE.

EDWARD E. KILBOURN, OF NEW BRUNSWICK, NEW JERSEY.

KNITTING-MACHINE.

SPECIFICATION forming part of Letters Patent No. 669,730, dated March 12, 1901.

Application filed November 3, 1898. Serial No. 695,394. (No model.)

*To all whom it may concern:*

Be it known that I, EDWARD E. KILBOURN, a citizen of the United States, residing at New Brunswick, in the county of Middlesex and State of New Jersey, have invented certain new and useful Improvements in Knitting-Machines; and I do hereby declare the following to be a full, clear, and exact description of the invention, such as will enable others skilled in the art to which it appertains to make and use the same.

My present invention relates to the art of knitting, and has for its object the improvement of circular-knitting machines, more especially the class of such machines that is employed in knitting seamless hose. In the manufacture of such hose it is often desirable to throw in a strengthening-thread on the back of the leg, above the heel, and also in the same or other hose to throw a strengthening-thread in the bottom of the foot. The devices which in part constitute my present invention are designed to effect these two results, either together in the same stocking or separately in different stockings. I have in this instance shown my present improvement as adapted to and connected with the circular-knitting machine which forms the subject of my former application for patent filed May 4, 1896, and given Serial No. 590,218, though it will of course be understood that the principle of my invention may be applied to any other knitting-machine with which it can be operated.

In the accompanying drawings I have illustrated the best form in which I have contemplated embodying my invention to operatively combine the same with the character of knitting-machine heretofore referred to, and my said invention is disclosed in the following description and claims.

Figure 14:
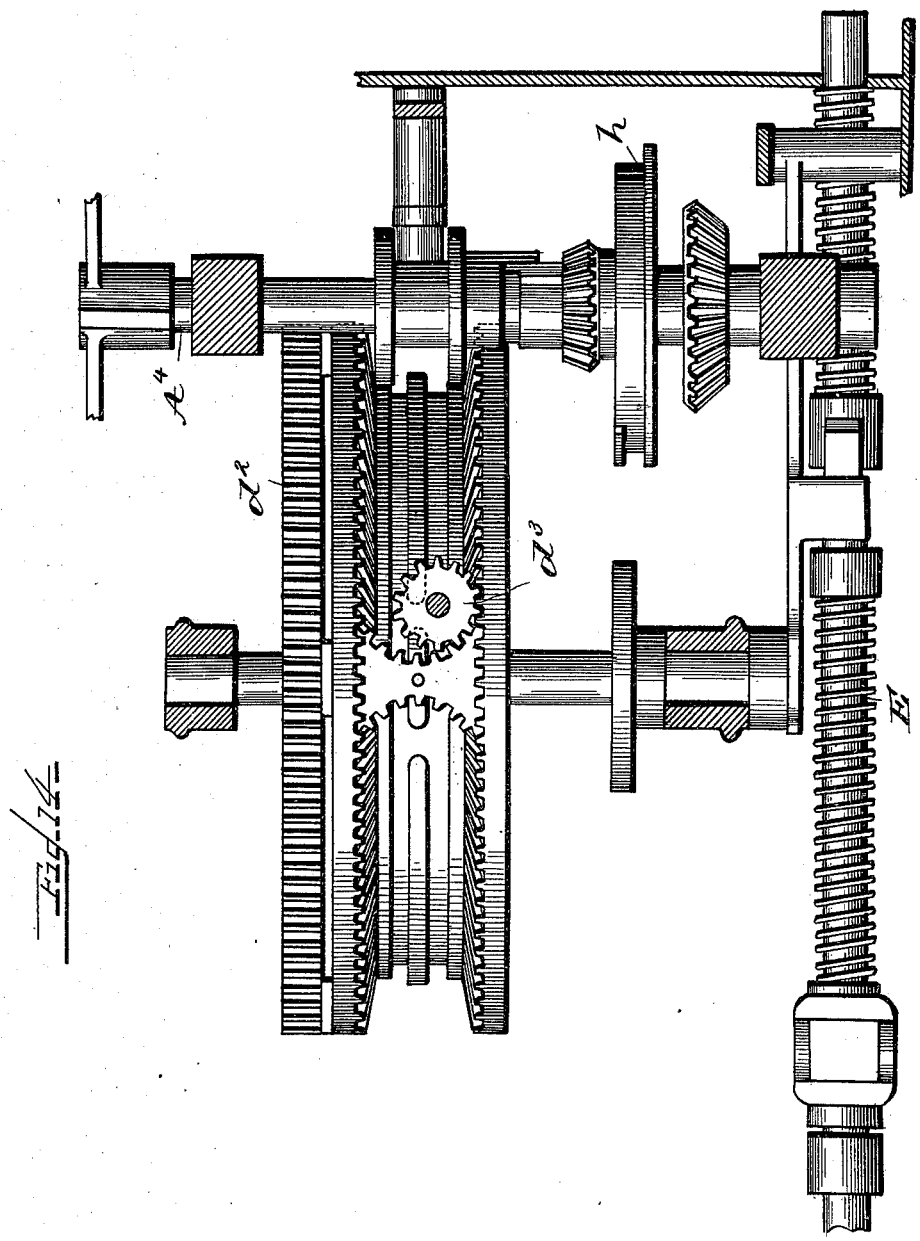
Figure 29:
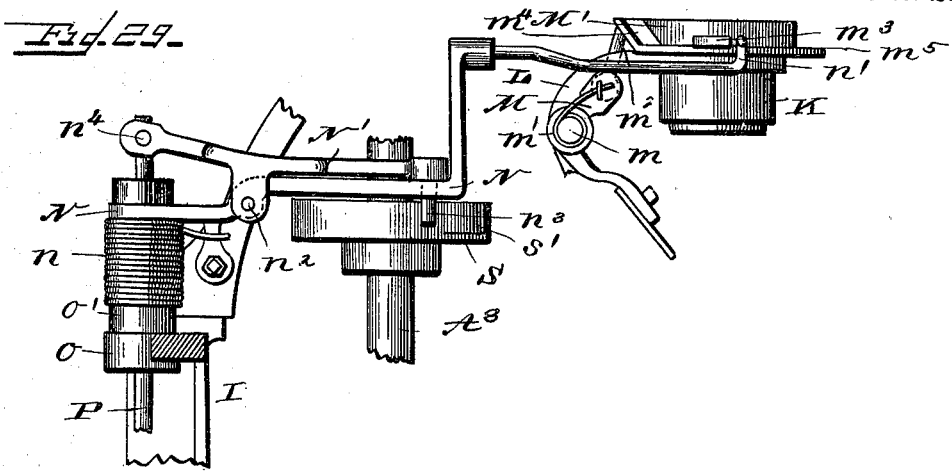
Figure 30:
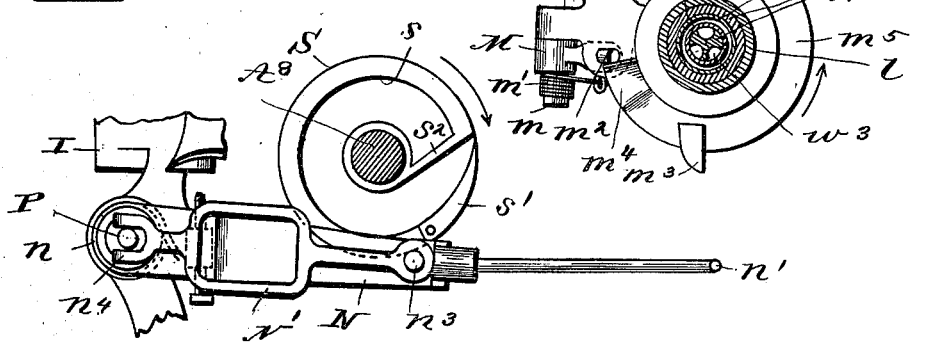
Figure 31:
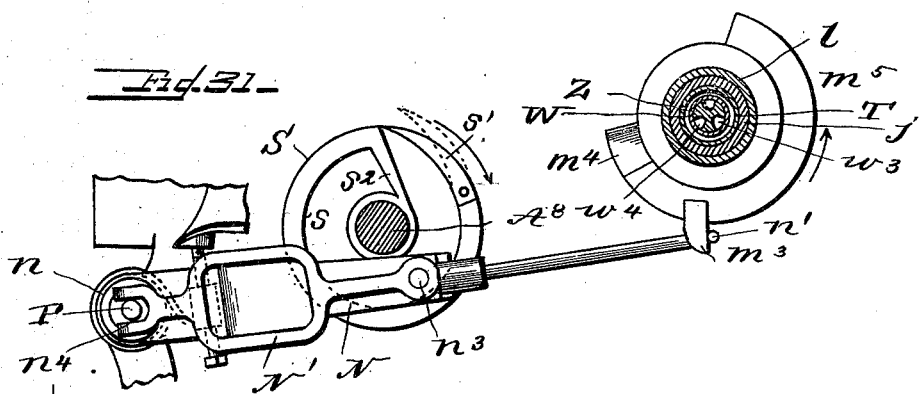

In the drawings which are filed herewith and form a part of this application, Figure 1 is a plan view of my said knitting-machine with my present invention attached. Figs. 2 and 2ª, taken together, give a view in front elevation of my said machine. Figs. 3 and 3ª, taken together, give a view in rear elevation. Figs. 4 and 4ª, taken together, give a plan view of the mechanism below the bed-plate of the machine. Fig. 5 is a view of the mechanism adjacent to the right-hand end of the machine. Fig. 6 is a view in elevation of mechanism adjacent to the left-hand end of the machine. Fig. 7 is a plan view of mechanism below line *x x*, Fig. 3ª. Figs. 8, 9, 10, 11, 12, and 13 are views of details and detached portions of the mechanism shown in Fig. 7. Fig. 14 is a plan of mechanism near the right-hand end of the machine, parts of the mechanism immediately beneath the bed-plate being removed. Figs. 15, 16, and 17 are details of parts of the devices which change or vary the stitch. Fig. 18 is a top or plan view of the needle-cylinder and connected devices with the bobbin-holders removed and with the releasers for the reciprocating thread-guide driver in one position, and Fig. 19 is a like top plan view with the releasers in another position. Fig. 20 is a sectional view of the extension of the cam-cylinder-driving shaft. Fig. 21 is a plan of the gearing on the thread-guide-supporting arm. Fig. 22 is a detail of the devices connecting the gearing on the arm and the shaft extension. Fig. 23 is an elevation of the upper end of the extension of the cam-cylinder-driving shaft with the thread-controlling devices, a part being broken away. Fig. 24 is a vertical sectional view of the main part of the construction shown in Fig. 23. Fig. 25 is a section taken on line 3 3, Fig. 26 is a section on line 4 4, Fig. 27 is a section on line 2 2, and Fig. 28 is a section on line 1 1, all of which lines are to be found in Fig. 24. Fig. 29 is a side elevation of the devices which control the splicer cam-ring. Figs. 30 and 31 are top views of the same. Figs. 32 and 33 are two views, one at right angles to the other, showing the cam which serves to actuate the devices which control the splicer cam-ring. Fig. 34 is a development of lower cam-cylinder in a straight line, and Figs. 35 and 36 are views of one of the releasers for the reciprocating thread-guide driver in two different positions.

In most particulars the main operative parts of the machine shown in the figures of the drawings just described are like those shown and described in my former application, Serial No. 590,218, hereinbefore referred to.

In the drawings, 1 is the bed-plate of the machine, and 2 2 are the standards or ends, which, with the bed-plate, constitute the supporting-frame of the machine.

X X' are the fast and loose pulleys on the power-shaft A of the machine. This shaft communicates a continuous rotary motion to the cam-cylinder-operating shaft A' through a transversely-extending shaft $A^2$ and connecting bevel-gearing or else communicates an oscillating motion to said shaft for reciprocating work through shaft $A^3$, extending longitudinally of the machine near the front of the same, shaft $A^4$ extending transversely of the machine, and which is provided with a crank $A^5$, which is connected by a pitman $A^6$ to a reciprocating rack $A^7$ and connecting-gearing and clutch mechanism. The clutch mechanism includes a clutch $c$, which is mounted upon the shaft A and serves in one position to connect that shaft with shaft $A^2$ for continuous circular work or with shaft $A^3$ to move the crank $A^5$ to give reciprocating motion to shaft A' whenever a clutch $c'$ shall connect the gear-wheel $a^3$, with which the rack $A^7$ engages, with the shaft $A^2$. These constructions here briefly described are the same as in my said former application, where a detailed description of them is given.

The machine is provided with what are termed in the art "narrowing" and "widening" devices, or devices which enlarge the tubular web to form the heels and toes of the stocking. The narrowing is effected by throwing certain needles out of and into operative relations with the needle-actuating cam, and this movement of the needles is accomplished through the cams $a$ and $a'$ on shaft $A^3$, (see Figs. 4 and $4^a$,) and the movement of the needle-actuating devices from one needle to another is effected by mechanism deriving its motion from the transverse shaft $A^4$, which through suitable connecting-gearing actuates the mangle-wheel $d^3$, which by means of a spur-gear $d^2$, connected therewith, actuates a gear-wheel $d'$, which in turn drives two worm or screw shafts D D, one on each side of the machine, and the worms or screws of these shafts, by the aid of certain adjunctive mechanism, effect the proper advancement and withdrawal of the devices for moving the needles out of and into operative positions. These are the same as in my said former application. A tension is put upon stitches on the needles in operation during narrowing and widening by a tension device E', which engages the outside of the web, as in my former application.

The devices for stopping circular knitting are also the same and are controlled in the same manner by the cam-wheel F', the lever F, and the shifter-rod E. The devices for starting and stopping reciprocating knitting are controlled by devices acting independently of those which govern the starting and stopping of circular work. These devices consist of the cam-wheel H' and coöperating devices connecting it with the clutch $c'$. This cam-wheel is mounted on shaft H, extending longitudinally at the back of the machine, and is actuated by a worm $h$ on shaft $A^4$ and connecting-gearing.

The machine is provided with means for increasing and decreasing the length of the stitch to increase and diminish the size of the circular web which the machine is knitting. These devices are the same as in my former application and are more particularly shown in Figs. 15, 16, and 17. Between every pair of needles in the needle-cylinder $A^\times$ is a hooked sinker $a^\times$, and these sinkers and the part of the needle-cylinder to which they are attached are moved up or down to increase or decrease the length of stitch in a well-known way. This is effected by the shaft G, which has a crank or eccentric that is connected with the said sinkers and their support, this shaft in turn being operated by a cam or cams on the cam-wheel F', lying in a different plane from those which act upon the lever F, through the three-armed lever G', link $g$, and crank $g'$ on the shaft G. One of the arms of the lever G is engaged and operated at the time of the stopping of circular work by the projection $e$ on the shifter-rod E, this construction being the same as in my former application. The shaft on which the cam F' is mounted also carries what I term "pattern" gear-wheels, consisting of two mutilated gear-wheels $f f'$, one fast and the other loose upon the shaft of the cam-wheel. These gears are both driven by the elongated pinion $f^2$, which moves with a worm-wheel $f^3$, Fig. 4, the worm-wheel $f^3$ receiving motion from the worm $b$ on the shaft B, which is operated through connecting-gearing from the shaft A. This construction is also the same as that in my said prior application and operates in the same way.

At the rear side of the machine there is a standard I, which takes the place of the standard O of my former application. The upper end of this standard is inclined or curved inwardly and forms a support for the upper portion of the shaft $A^8$, which is an extension of the shaft A'. This shaft A' is provided shortly above the bed-plate with two gears $B^2$ and $B^3$, which engage with and move the cam-cylinders $B^{10}$ and $B^{11}$ to effect knitting for circular work. The upper of the two gear-wheels, $B^3$, is rigidly secured to the shaft A', and the other is loosely mounted thereon and is given motion from the gear $B^3$ through the intervention of the collar $B^4$, said collar being engaged and moved by a certain projection from the gear $B^3$ and it in turn having a projection engaging and moving the gear $B^2$, the construction providing sufficient lost motion on a reversal of the shaft to permit the gear $B^2$ to remain stationary during reciprocating work.

Above the upper end of the standard I an arm J is pivotally mounted upon the shaft $A^8$ as a center. At the outer end of the arm J is supported the thread-controlling device, a part of which constitutes a portion of the novel features of this case.

The upper part of the standard I is provided with a sleeve $i$, through which the shaft $A^8$ turns, and the arm J is provided with a downwardly-extending sleeve $j$, which engages and turns upon the sleeve $i$, so that the turning of the shaft $A^8$ has no tendency to turn the arm J, as it does not come in contact with it. A plate I' is interposed between the sleeve $j$ and the enlarged base of sleeve $i$, and this plate is provided with means for adjustment substantially the same as is shown in the said application Serial No. 590,218, and the sleeve $j$ has an extension $j'$, which carries a pin $j^2$, as in my said prior application. The pin $j^2$ also effects like functions as in the said former application.

The arm J at its outer end is provided with a downwardly-extending sleeve $j^3$, on the lower end of which is rigidly secured the collar K, having at its upper edge the projecting flange $k$, (see Figs. 24 and 26,) which descends to the lower side of the collar at one place to form the cam K', the flange being entirely cut away at $k^2$. Upon the sleeve $j^3$, above the collar $k$, is mounted the sleeve $l$, to the lower end of which is attached the thread-guide L for circular work. The thread-guide M for splicing is pivoted to the guide L (see Figs. 23 and 24) upon a pin $m$. The guide M is made with a part above the point of pivoting extending nearly at a right angle to the other portion. To this angular part is pivoted a rod $m^2$, which extends up through an opening in the guide L. A coiled spring $m'$ is placed upon the pin $m$ and made to engage the guide M in such a manner as to normally hold the guide in the position shown in Fig. 24. Upon the sleeve $l$ is mounted a collar $l'$, secured to the sleeve, and beneath this collar is a cam-ring M', revolubly mounted upon the sleeve and held from rising by the collar $l'$. This cam-ring has upon it a projection $m^3$, (see Figs. 25, 29, 30, and 31,) by which it may be held stationary when so desired; but at all other times it revolves with the sleeve $l$. The cam-ring M' has a cam $m^4$. (See Figs. 30 and 31.) This cam is in position to engage the upper end of the rod $m^2$, and if the cam be stationary it will depress the rod $m^2$ and throw the splicing-guide outward in position to deliver thread to the needles, and a flange $m^5$, which is a horizontal continuation of the cam-flange, operates to hold the thread-guide in operative position as long as the rod is in engagement therewith. I provide certain mechanism which at the proper time effects the holding of the cam-ring M'. This mechanism is most clearly shown in Figs. 29, 30, 31, and 32. The standard I is provided with two brackets $I^2$ $I^3$. (See Fig. 3ª.) The first of these two brackets is provided with an upwardly-extending sleeve $o$. Upon this sleeve is mounted the hub $o'$ of a lever N. The hub of this lever is embraced by a spring $n$, which is connected to the sleeve and the bracket, so that the spring tends to throw the lever N inward toward the extension $A^8$ of shaft $A'$ and toward the thread-controlling devices. The outer end of this lever is provided with a hook $n'$, (see Fig. 29,) which when thrown inwardly engages the projection $m^3$ on the cam-ring M' and holds the said cam-ring from movement. A lever N' is pivoted by a horizontal pivot $n^2$ to the lever N, and this lever lies upon the top of lever N and moves with it. It is provided at its outer end with a pin $n^3$, which extends downward through the lever N. The opposite end of the lever N' is pivoted at $n^4$ to a rod P, which extends downwardly through the hub $o'$ and bracket $I^3$ and a little above its lower end is provided with an adjustable collar $p$. Between this collar and the bracket $I^3$ is placed the coiled expansion-spring $p'$, which tends to draw the rod P downward and to keep the outer end of the lever N' raised, so that the lower end of the pin $n^3$ is raised flush with the under side of the lever N.

The lower end of the rod P, below the collar $p$, loosely engages a socket in one end of the lever Q. To the opposite end of this lever is pivoted the upper end of the link $q$, which at its lower end is in turn pivoted to the arm $r$ of a shaft R, mounted in suitable bearings at some distance below the bed-plate of the machine. The pattern-wheel $f'$ is provided with a cam-plate $f^4$, secured to it by bolts passing through slots in the plate to permit of such adjustment as may be desirable or necessary, and the shaft R is also provided with an arm $r'$, which is adapted to engage the cam-plate $f^4$. So long as the arm $r'$ is in engagement with the cam-plate $f^4$ the rod P will be forced upward, compressing the spring $p$, and the pin $n^3$ will be forced downward below the under surface of the lever N, as shown in Fig. 29.

On the shaft $A^8$ is secured the disk S. This disk has a flange $s$ extending upwardly around its edge, and a portion of this flange $s$ is pivoted so as to form a latch, and a short cam-web $s^2$ connects the hub of the disk with the flange $s$ adjacent to the latch $s'$. The disk is so placed that the upper edge of the flange is just below the level of the under side of the lever N, so that when the pin $n^3$ is raised the spring upon the hub of the lever N will throw it inwardly and place the hook $n^4$ in the path of the projection $m^3$ and hold the cam-ring M' stationary. The cam-ring M' moves as indicated by the arrow in Figs. 30 and 31, and as soon as the rod P is raised and the pin $n^3$ depressed, so as to project below the under side of the lever N, the pin engages the cam-web $s^2$ and is forced outwardly, the latch $s'$ permitting it to pass outward beyond the flange $s$. It thereafter bears against the outer side of the flange, closing the latch $s'$ and maintaining it in its closed position.

Within the sleeve $j^3$ is mounted a sleeve T, to which is secured the reciprocating thread-guide T'. The main body portion of this thread-guide is rigidly secured to the sleeve T, and this part is provided with the latch-opener $t$, and the lower end is constructed substantially the same as the lower end of the reciprocating thread-guide shown in my former application hereinbefore referred to, and the same is driven in like manner by the driver U, and which is disengaged from such thread-guide at each side of the machine by the releasers V V. These releasers vary in construction from those in my said former application. Each releaser carries, attached to or forming a part thereof, a stop $v$, elevated above the main body of the releaser. These stops serve to engage and arrest the thread-guide at its side of the machine, if carried by momentum beyond the point to which it is moved by the driver. On the top of the casing, in which is the dovetail guide in which the supports of the releasers move, as in my former patents and application, are secured the cam-plates $v'$ $v'$. These plates have each an incline toward the releaser at that side of the machine with which the releasers are brought into contact at the close of reciprocating knitting, and the said inclines acting as cams raise the releasers out of operative position until the narrowing and widening devices are again put in action.

The thread during reciprocating work is delivered to the needles by a guide-eye in the lower end of the bell-crank lever $T^2$, pivoted to and forming a part of the reciprocating thread-guide. This lever is rigidly secured to the pintle $t^2$, which forms the pivot of the lever, and a coiled spring $t^3$ is connected thereto in such manner that it constantly exerts its force in the direction to throw the lower arm of the lever in line with the main body of the guide.

Within the sleeve T is placed the tube W, which extends to a considerable distance above the arm J. This tube forms a conduit for conducting the thread to the guides and has the interior of the same divided into three or more passages for holding the different threads apart from each other. This is done in this instance by inserting a filling-piece Z within the tube, said filling-piece having on its exterior three longitudinally-disposed grooves forming with the tube the passages desired.

The gear $J^5$, the most outward of the gear-wheels connecting the thread-delivering mechanism with the shaft $A^8$, is rigidly secured to the sleeve T and is provided with an upwardly-extending hub $j^4$. This hub is provided with the lug or projections $j^5$. A spider Z' for carrying thread-bobbins is secured upon the tube W, and the hub of this spider has a downwardly-extending projection $z$ to engage with projection $j^5$, so that the rotation of the gear-wheels will effect a rotation of the spider and tube, whereby the proper relation of the thread to its guide is maintained.

During reciprocating work the thread-guide T' is moved by the driver, as before stated, in oscillations of less than the full circumference of the needle-cylinder, so that in this case the tube W will stand at rest. In order that the frictional contact of the hub of the spider with the hub $j^4$ of the gear-wheel shall not cause the two to move together during reciprocating work, a friction device $z^2$, consisting of two spring-arms with faces engaging the hub of the spider, is employed. The two arms of the device are connected by a bolt and nut, by which the amount of friction can be regulated. $j^6$ is a like friction holding device for the sleeve T, and $l^\times$ is a further one for the sleeve $l$.

On the spider Z' are pins, only two of which are shown, for holding bobbins for the yarn passing to the various thread-guides. The threads from the bobbins pass up through thread-eyes $w'$ $w^2$ and thence downward and through the openings $w^3$ $w^4$ to the appropriate passage within the tube. One of the threads is preferably supplied from a bobbin located directly above the tube W, and which will then pass downward throughout the entire length of the tube W.

In order that the heel may be as strong as the reinforced parts of the stocking, I have frequently carried two threads to the reciprocating thread-guide.

As the reciprocating thread-guide and the sleeve are connected with the gear $J^5$, all of the gear-wheels carried by the arm J move with the reciprocating thread-guide. It therefore becomes necessary to disconnect the first of the gear-wheels $J^2$ from the shaft $A^8$ during reciprocating work and to connect it to the shaft $A^8$ during circular work. The gear-wheel $J^2$ is loose upon the shaft $A^8$ and has upon its upper side a radial rib $j^\times$. (See Fig. 21.) Above the gear a collar $a^8$ is rigidly secured to the shaft. Above the collar $a^8$ is a loose clutch member $c^4$, which has a downwardly-extending projection $c^5$. This projection lies in a groove in the collar, and the clutch member is provided with an annular groove $c^6$, extending horizontally around it. This groove is engaged by a fork $C^2$, rigidly secured to rod $P^2$ and which extends downwardly through and is guided by the brackets $I^2$ $I^3$, and thence downward to the cam-wheel H'. This rod is normally held down by a coiled spring $p^4$ and is raised as soon as the narrowing and widening devices are put in operation by the cam $H^2$ on the cam-wheel H'. In its lower position the lug $c^5$ is in the path of the radial rib $j^\times$ and on the revolution of shaft $A^8$ drives the gears and the reciprocating thread-guide with a continuous circular motion. When, however, circular work is discontinued and the narrowing and widening devices are put into motion, the rod $P^2$ is lifted and the projection raised out of the path of the rib $c^5$, disconnecting the shaft $A^8$ from the gears and permitting the reciprocating thread-guide to be moved to and fro by its driver, as before described.

As has been before stated, when the cam-ring M' is held stationary the splicing thread-guide or splicer is thrown into operative position by the cam portion $m^4$ of its flange, and when the thread-guide reaches the end of the flange $m^{4a}$ it moves inward to its position of rest. To do this, it must cross the line of needles on each movement. It will also be noticed that as the collar K is stationary the upper end of the lever $T^2$ engages with the cam $k'$ on every revolution of the thread-guide and is thrown inward. It is kept in this position by the flange $k$ until the upper end of the lever reaches the end of the said flange, when it drops through the space $k^2$. In doing this the lower end of the lever has to pass across the line of needles, and it again passes them as the upper end of the lever engages and is raised by the cam $k'$. From the description heretofore given it will be seen that the reciprocating thread-guide (the guide delivering thread or yarn to the needles during reciprocating work) is given continuous circular movement during circular work by the gearing carried by the arm J. This thread-guide has on its forward side a lug $t^4$, through which is passed a screw $t^5$, (see Fig. 18,) upon which there is a clamping-nut $t^6$. The circular thread-guide L has an upwardly-extending flange $l^2$, which is engaged by the screw $t^5$, carried by the reciprocating thread-guide, during circular work. The circular thread-guide is thus given its proper movement, and when thus moved is in the proper position to deliver thread or yarn to the needles for continuous circular knitting.

The lower cam-cylinder $B^{11}$ is constructed in a peculiar manner to permit the passage back and forth of the splicer and the thread-eye arm $T^2$ of the reciprocating thread-guide. The interior of this lower cam-cylinder is shown in Fig. 34 developed in a straight line. The cam moves in the direction of the arrow shown in the figure. The needles when not actuated by the cams of this cylinder are held at the usual level by the rib or ledge $y\ y$, upon which the nibs of the needles rest. As the cam moves forward the needles are first depressed by the cam $y'$. This cam depresses the needles below the plane of the ends of the splicing thread-guide. They are held a short time in this position by the straight cam-groove $y^2$ and are by the cam $y^3$ raised to take the thread from the circular thread-guide. As soon as the needles engage the thread they are depressed by the knitting-cam $y^4$. Immediately after passing the cast-off point $y^5$ they are raised slightly to relieve the tension upon the yarn or thread, but are held in a position even lower than they are when depressed by the cam $y'$, their nibs then resting upon the straight ledge $y^6$. They are finally raised to the ledge or rib $y$ by the cam $y^7$.

The splicing thread-guide or splicer is just a little in advance of the circular thread-guide, and when acted upon by the cam $m^4$ this thread-guide is thrown outward into operative position across the needles held depressed by the straight portion $y^2$ of the cam-groove. When in this position, the thread carried by the guide is taken by the needles as well as the thread delivered by the circular thread-guide. As the rod $m^2$ leaves the flange $m^5$ the splicing thread-guide is thrown inward by the spring $m'$ again passing over the tops of the depressed needles, so that the splicing-thread is carried across the interior of the tubular web to the opposite or nearly opposite side of the same. These "float-threads," as they are generally termed, are cut away in the finishing of the stocking and leave no ends upon the outside of the same.

The needles actuated by the cam-cylinder $B^{11}$ are the half at the back of the machine nearest the standard I. The opposite half of the needles are those which form the heel and are at the back of the stocking. In order that the splicing thread-guide shall be thrown across the row of needles within the half-circle of needles controlled by the lower cam-cylinder, the flange $m^5$ and its attached cam $m^4$ extend more than half-way around the ring M', and when this ring is locked in position by the hook $n'$ engaging the projection $m^3$ the ring is held in such position as to insure the proper results.

It is to be further noted that the delivery-eye of the reciprocating thread-guide passes across the line of needles at every revolution of the machine. This is caused by the stationary cam-ring K. The cam $k'$ of this ring is located at the back of the machine, nearly midway of the half-circle of needles actuated by the lower cam-cylinder. The space $k^2$, caused by cutting away the flange $k$, is located on the side of the cam $k'$ on which the thread-guides approach said cam and is of such extent that when immediately preceding reciprocating knitting the thread-guide for circular work is moved to the position midway of the stationary half-circle of needles the upper end of lever $T^2$ will drop from flange $k$ and the thread-delivery eye will be carried into operative position. On the first reverse movement of the upper cam-cylinder to begin reciprocating work the upper end of the lever $T^2$ passes beneath the flange $k$, and as the thread-guide is never moved far enough to cause it to engage the cam $k'$ the lower part of the thread-guide remains in position to cause the delivery-eye to deliver the thread to the needles at both movements of the cam-cylinder, said guide being engaged by the driver U, as heretofore explained. At the close of reciprocating work the reciprocating thread-guide is brought near to the cam $k'$, so that on again beginning circular work the upper end of the lever $T^2$ is engaged by the cam $k'$ and is raised, throwing the lower end with the delivery-eye inwardly. The low part $y^6$ of the path of the needles in the lower cam-cylinder is just the right distance behind the knitting-cam to permit this movement. This carries the heel thread or threads inwardly, so that as the knitting continues this thread is carried from one point to another inside of the stocking. As during circular movement the delivery-eye of this lever is out of operative relation to the knitting-cams, the dropping of the lever T² from the flange k and the consequent movement of the delivery-eye, as also its movement by the cam k', have no effect on the heel thread or threads, as they are not engaged by the needles.

The operation of the mechanism shown and described will be understood from the foregoing description by those familiar with the art; but it is believed best to give a general description in order that the relation of the operation of the different parts to each other may be made as clear as possible.

In starting circular work the rod E is forced to the right, as in my said former construction, and the clutch e connects the driving-shaft A with the shaft A² and shaft A' for continuous rotary motion, and circular work is begun. During the continuance of circular knitting the upper end of the lever T² drops from the flange k of the stationary ring K and the lower end of the same passes across the line of needles and shortly thereafter engages cam k' and is raised, bringing the lower end back to near the center of the needle-cylinder; but these motions occur when the reciprocating thread-guide is opposite the portion of the rear half-circle of needles whose nibs rest upon the straight portion $y^6$ of the lower cam-cylinder and nothing is effected by this movement. The lever G' is operated by its actuating-cams to change the length of stitch as desired in the progress of knitting until the point in the ankle of the stocking is reached at which a thickening thread is desired. This point has been determined beforehand and the cam $f^4$ on pattern-wheel $f'$ has been adjusted to the proper place upon the wheel. During the knitting of the upper part of the leg the arm $r'$ of the shaft R has been engaged by the cam $f^4$ and the shaft R turned to draw down the rod q and the end of the lever Q to which it is attached, thereby elevating the rod P and the rearwardly-extending end of lever N', keeping the pin $n^3$ well depressed below the lever N and bearing against the disk S, thereby holding the hook $n'$ well out of the path of the projection $m^3$ on the disk M', permitting the said ring to revolve with the circular guide. When the predetermined point for splicing to begin has been reached the arm $r'$ passes inward from the cam $f^4$ by reason of the pressure of the spring $p'$ and the rod P and the pin $n^3$ is raised, permitting the lever N to be swung inward by its spring n, and on the next revolution of the disk M' the projection $m^3$ is caught by the hook $n'$ and the ring is arrested, bringing the splicer into operation. Circular work with the thickening threads on the back of the stocking is continued until the point for the heel is reached. Circular work is stopped by the rod E being forced to the left, causing the clutch c to be moved in the same direction, disconnecting the driving-shaft A from shafts A² and A' and connecting it with shaft A³, starting the narrowing and widening devices and putting into operation the placing mechanism, which first places the cam-cylinders and thread-guides in the proper position to commence reciprocating work—that is, bring the circular thread guide and splicer in the rear of the sleeve $j^3$ of the plate J and about in the center of the rear half of the needles actuated by the lower cam. The construction permits the narrowing and widening devices to be in operation a greater or less period of time, as desired, for the work in hand, when the cam-wheel will shift clutch c', starting up reciprocating motion and at the same time causing cam H² to lift the rod P² and raise the clutch projection $c^5$ from the path of the radial lug $j^x$, thereby disengaging the shaft A⁸ from the gears on the plate J, permitting them to oscillate with the reciprocating thread-guide. When the rod E was moved to the left, the projection e thereon engaged one arm of the lever G' and turned it to give the proper length of stitch for the heel. As soon as the heel is completed the cam-wheel H' releases clutch c', and coming to the proper position permits the rod P² to drop to bring the clutch projection into such position as to connect the shaft A⁸ with the gears on the plate or bracket J. The rod E is now moved to the right and circular work is resumed. As the splicer-controlling parts have remained in the same position the foot of the stocking is knitted, with the spliced or thickening threads thrown in, until the toe is reached, when the same changes are made, as for the heel only, that a greater or less period elapses between the stopping of circular work and the beginning of reciprocating work, as may be desired. As soon as the toe is finished the cam $f^4$ forces the arm $r'$ outward, moving the lever Q so as to force the rearward end of lever N' up and the pin $n^3$ downward below the lever N, in which position the pin serves to withdraw the hook $n'$ from the path of the projection $m^3$ on the splicer-ring M', thus permitting the leg of another stocking to be knit, as before set forth.

It is to be understood that the cam $f^4$ can be so formed or adjusted as to permit the splicer to operate only when the machine is knitting the ankle of the stocking without operating to splice the foot of the stocking or will splice the bottom of the stocking without splicing the ankle, if it be so desired.

What I claim, and desire to secure by Letters Patent, is—

1. In a circular-knitting machine organized for circular and reciprocating work, the combination with the needle and cam cylinders, of a thread-guide for circular work, a splicer thread-guide for delivering an additional thread to the needles, during circular work, means for stopping circular work including means for stopping both of said thread-guides, means for starting circular work and circular thread-guide and independently-operating devices for starting the said splicer-guide, substantially as described.

2. In a circular-knitting machine organized for circular and reciprocating work, the combination with the needle-cylinder, of a thread-guide for circular work, a splicer thread-guide for delivering an additional thread to the needles during circular work, a thread-guide for reciprocating work, means for actuating said thread-guides, means for stopping circular work and the circular and splicer thread guides, and means for thereafter starting reciprocating work and the reciprocating thread-guide, substantially as described.

3. In a circular-knitting machine organized for circular and reciprocating work, the combination with the needle-cylinder, of a thread-guide for circular work, means for starting circular work and thread-guide, a splicer thread-guide for delivering an additional thread to the needles, means for starting and actuating said splicer-guide while the circular thread-guide is in operation, and means for automatically withdrawing it from operation for a number of revolutions of the machine without affecting the said circular thread-guide, substantially as described.

4. In a circular-knitting machine organized for circular and reciprocating work, the combination with the needle-cylinder, of the circular thread-guide, a splicer thread-guide-actuating means for said guides, means for controlling the said thread-guides including means for stopping the circular thread-guide and the splicer thread-guide at the same time, and means for throwing the splicer thread-guide out of operation without affecting the circular thread-guide, substantially as described.

5. In a circular-knitting machine organized for circular and reciprocating work, the combination with the needle-cylinder, of a circular thread-guide revolubly mounted above the needle-cylinder, of a reciprocating thread-guide, mechanism for reciprocating the said reciprocating thread-guide during reciprocating work and means for giving it a continuous circular motion during circular work, said reciprocating thread-guide serving as a driver to give the circular thread-guide continuous circular motion during circular work, substantially as described.

6. In a circular-knitting machine organized for circular and reciprocating work, the combination with the needle-cylinder, of a circular thread-guide revolubly mounted above the said cylinder, a thread-guide for reciprocating work, means for reciprocating the said thread-guide for reciprocating work, and means for giving the same a continuous motion during circular work, said reciprocating thread-guide engaging and driving the circular thread-guide during circular work and means for adjusting the distance between them, substantially as described.

7. In a circular-knitting machine organized for circular and reciprocating work, the combination with the needle-cylinder and needle-actuating devices, of a thread-guide for reciprocating work comprising among its members a main body moving in one path around the needle-cylinder during circular work but out of operative relation with the needle-actuating devices and reciprocating in said path in operative relation with the needle-operating devices during reciprocating work, substantially as described.

8. In a circular-knitting machine organized for circular and reciprocating work the combination with the needle-cylinder and needle-actuating devices, of a thread-guide for reciprocating work comprising among its members a main body moving in one path around the needle-cylinder during circular work but out of operative relation with the needle-actuating devices, and reciprocating in said path in operative relation to the needle-actuating devices during reciprocating work and a movable part mounted on said main body and carrying the thread-delivery eye and means for moving said thread-eye inwardly out of operative position, substantially as described.

9. In a circular-knitting machine organized for circular and reciprocating work, the combination with the needle-cylinder and needle-actuating devices, of a thread-guide for reciprocating work comprising among its members a main body moving in one path around the needle-cylinder but out of operative relation with the needle-actuating devices during circular work, and reciprocating in said path in operative relation to the needle-actuating devices during reciprocating work and a movable part mounted on said main body carrying the thread-eye and means located out of the path of said guide during reciprocating work for moving said thread-guide inwardly out of operative position, substantially as described.

10. In a circular-knitting machine, the combination with the needle-cylinder, with a thread-guide for circular work, a support for the same above the cylinder, a splicer thread-guide for delivering an additional thread to the needles, and a cam on said support to throw the said splicer-guide into operative position, substantially as described.

11. In a circular-knitting machine, the combination with the needle-cylinder, of a support above the cylinder, a thread-guide revolubly mounted on said support, a splicer thread-guide normally held out of operative position and a cam mounted on said support for throwing said splicer-guide into operative position, substantially as described.

12. In a circular-knitting machine, the combination with the needle-cylinder, of a support above said cylinder, a thread-guide for circular work revolubly mounted on said support, a splicer thread-guide pivoted to said circular thread-guide, a cam-ring revolubly mounted on the said support to operate the said splicer, and a controller for holding and releasing the said cam-ring, substantially as described.

13. In a circular-knitting machine organized for circular and reciprocating work, the combination with the reciprocating thread-guide and its driver, of the pivoted releaser and stop and a stationary cam for throwing said releaser and stop out of operative position, substantially as described.

14. In a circular-knitting machine, the combination of a plurality of thread-guides, of a tubular conduit for conducting the threads to the said thread-guides, said conduit having a separate passage for the thread of each guide, substantially as described.

15. In a circular-knitting machine organized for circular and reciprocating work, the combination with the thread-guide for circular work, the thread-guide for reciprocating work, of a conduit for conducting the thread to the said guides, said conduit having a separate passage for the thread of each guide, substantially as described.

16. In a circular-knitting machine organized for circular and reciprocating work, the combination with the thread-guide for circular work, a splicer thread-guide, a reciprocating thread-guide and a conduit for conducting the thread to the guides, said conduit having a number of separate passages for the threads, substantially as described.

17. In a circular-knitting machine, the combination with the needle-cylinder, of a support above the cylinder, a splicer thread-guide revolubly mounted upon said support and normally held out of operative position, a movable cam mounted on said support normally moving with said splicer, and means for holding said cam stationary to operate said splicer, substantially as described.

18. In a circular-knitting machine, the combination with the needle-cylinder, of the support above the cylinder, the splicer thread-guide normally out of operative position, the revoluble cam normally moving with the thread-guide, a spring-actuated lever for engaging and holding the said cam stationary and means for moving said lever and holding the same out of engagement with said cam, substantially as described.

19. In a circular-knitting machine, the combination with the needle-cylinder, of a support above the cylinder, of a splicer and its controlling cam-ring, a lever for controlling said cam-ring, and a cam for controlling the position of said lever, substantially as described.

In testimony whereof I affix my signature in the presence of two witnesses.

E. E. KILBOURN.

Witnesses:
L. P. WHITAKER,
B. W. BRACKETT.